United States Patent
Graceffo et al.

(10) Patent No.: US 9,755,674 B2
(45) Date of Patent: *Sep. 5, 2017

(54) METHOD FOR ENCRYPTION OBFUSCATION

(71) Applicant: Raytheon Company, Waltham, MA (US)

(72) Inventors: Gary M. Graceffo, Burke, VA (US); Andrew M. Kowalevicz, Arlington, VA (US)

(73) Assignee: Raytheon Company, Waltham, MA (US)

( * ) Notice: Subject to any disclaimer, the term of this patent is extended or adjusted under 35 U.S.C. 154(b) by 80 days.

This patent is subject to a terminal disclaimer.

(21) Appl. No.: 14/704,900

(22) Filed: May 5, 2015

(65) Prior Publication Data

US 2016/0267815 A1    Sep. 15, 2016

Related U.S. Application Data

(60) Provisional application No. 61/988,418, filed on May 5, 2014, provisional application No. 61/988,416, filed on May 5, 2014, provisional application No. 61/988,409, filed on May 5, 2014, provisional application No. 61/988,423, filed on May 5, 2014.

(51) Int. Cl.
*G09C 1/00* (2006.01)
*H04B 1/04* (2006.01)
*H04L 9/08* (2006.01)
*H04L 9/16* (2006.01)
*H04L 7/06* (2006.01)
*H04L 7/04* (2006.01)
*H04L 25/49* (2006.01)
*H04L 12/26* (2006.01)

(52) U.S. Cl.
CPC ............. *H04B 1/0475* (2013.01); *G09C 1/00* (2013.01); *H04L 7/042* (2013.01); *H04L 7/065* (2013.01); *H04L 9/08* (2013.01); *H04L 9/16* (2013.01); *H04L 25/4902* (2013.01); *H04L 43/087* (2013.01); *H04L 43/0864* (2013.01)

(58) Field of Classification Search
CPC ...... H04K 1/06; H04N 7/1675; H04N 7/1696; H04L 2209/125; H04L 9/0625
See application file for complete search history.

(56) References Cited

U.S. PATENT DOCUMENTS 3,899,772 A    8/1975 Mead et al.
3,916,307 A    10/1975 Hekimian
(Continued)

OTHER PUBLICATIONS

"U.S. Appl. No. 15/155,490, Preliminary Amendment filed Jun. 30, 2016", 6 pgs.
(Continued)

*Primary Examiner* — Yonas Bayou
(74) *Attorney, Agent, or Firm* — Schwegman Lundberg & Woessner, P.A.

(57) ABSTRACT

A system and method provide a signal carrier; an overt persistent digital channel containing a host signal and carried on the signal carrier; a non-persistent channel encoded onto the host signal by timing variation of the host signal, the non-persistent channel including access data for accessing hidden information in the host signal.

14 Claims, 4 Drawing Sheets

STEGANOGRAPHIC APPROACH

(56) References Cited

U.S. PATENT DOCUMENTS

| | | | |
|---|---|---|---|
| 4,221,931 A * | 9/1980 | Seiler | H04K 1/06 |
| | | | 380/275 |
| 4,631,600 A | 12/1986 | Fukui | |
| 5,077,761 A | 12/1991 | Tokunaga | |
| 5,228,062 A | 7/1993 | Bingham | |
| 5,254,843 A * | 10/1993 | Hynes | G06K 7/084 |
| | | | 235/449 |
| 5,699,370 A | 12/1997 | Kaniwa et al. | |
| 5,774,508 A | 6/1998 | Kallman et al. | |
| 6,163,209 A | 12/2000 | Myers | |
| 6,396,877 B1 | 5/2002 | Hollenbach et al. | |
| 7,133,647 B2 | 11/2006 | Dent | |
| 7,200,014 B1 | 4/2007 | Hawkes et al. | |
| 7,269,261 B1 * | 9/2007 | Jennings | H04L 9/0894 |
| | | | 380/286 |
| 7,497,637 B2 | 3/2009 | Brandstein | |
| 8,283,911 B1 | 10/2012 | Bierer | |
| 8,363,774 B2 | 1/2013 | Lin et al. | |
| 8,498,197 B2 | 7/2013 | Kent | |
| 8,717,147 B2 | 5/2014 | Bae et al. | |
| 9,509,538 B1 | 11/2016 | Al-dweik et al. | |
| 2002/0054605 A1 | 5/2002 | Aizawa | |
| 2002/0063933 A1 * | 5/2002 | Maeda | H04B 10/2504 |
| | | | 398/141 |
| 2002/0071556 A1 * | 6/2002 | Moskowitz | G11B 20/00086 |
| | | | 380/210 |
| 2004/0125952 A1 * | 7/2004 | Alattar | G06T 1/0064 |
| | | | 380/202 |
| 2005/0135501 A1 | 6/2005 | Chang et al. | |
| 2005/0286649 A1 | 12/2005 | Redfern | |
| 2006/0036411 A1 | 2/2006 | Nagai | |
| 2006/0239501 A1 * | 10/2006 | Petrovic | G06T 1/0028 |
| | | | 382/100 |
| 2006/0239503 A1 * | 10/2006 | Petrovic | H04L 9/002 |
| | | | 382/100 |
| 2007/0064849 A1 | 3/2007 | May | |
| 2007/0279784 A1 | 12/2007 | Yamamoto | |
| 2008/0090588 A1 | 4/2008 | Mizugaki et al. | |
| 2008/0175115 A1 | 7/2008 | Muraoka | |
| 2008/0253232 A1 | 10/2008 | Irie | |
| 2009/0196419 A1 * | 8/2009 | Tapster | H04L 9/0858 |
| | | | 380/256 |
| 2009/0287837 A1 * | 11/2009 | Felsher | G06F 19/322 |
| | | | 709/229 |
| 2010/0265139 A1 | 10/2010 | Beadle et al. | |
| 2011/0228943 A1 * | 9/2011 | Amirtharajan | H04K 1/06 |
| | | | 380/287 |
| 2011/0299678 A1 * | 12/2011 | Deas | H04L 9/003 |
| | | | 380/28 |
| 2012/0106380 A1 | 5/2012 | Vaidyanathan et al. | |
| 2013/0108042 A1 * | 5/2013 | Yin | H04N 21/4405 |
| | | | 380/255 |
| 2015/0318982 A1 | 11/2015 | Kowalevicz et al. | |
| 2015/0318985 A1 | 11/2015 | Graceffo et al. | |
| 2015/0319061 A1 | 11/2015 | Kowalevicz | |
| 2016/0336977 A1 | 11/2016 | Kowalevicz et al. | |

OTHER PUBLICATIONS

"U.S. Appl. No. 14/704,916, Ex Parte Quayle Action mailed Nov. 5, 2015", 8 pgs.

"U.S. Appl. No. 14/704,916, Preliminary Amendment filed Jul. 15, 2015", 3 pgs.

"U.S. Appl. No. 14/704,923, Non Final Office Action mailed Dec. 2, 2016", 25 pgs.

"U.S. Appl. No. 14/704,929, Preliminary Amendment filed Jul. 15, 2015", 3 pgs.

"U.S. Appl. No. 14/704,916, Notice of Allowance mailed Feb. 18, 2016", 17 pgs.

"U.S. Appl. No. 14/704,916, Response filed Jan. 5, 2016 to Ex Parte Quayle Action mailed Nov. 5, 2015", 6 pgs.

"U.S. Appl. No. 15/155,490, Preliminary Amendment filed May 16, 2016", 3 pgs.

"U.S. Appl. No. 14/704,923, Examiner Interview Summary mailed Mar. 30, 2017", 3 pgs.

"U.S. Appl. No. 14/704,923, Response filed Apr. 3, 2017 to Non-Final Office Action mailed Dec. 2, 2016", 8 pgs.

"U.S. Appl. No. 14/704,929, Notice of Allowance mailed Mar. 1, 2017", 8 pgs.

"U.S. Appl. No. 15/155,490, Non Final Office Action dated Apr. 13, 2017" 10 pgs.

"U.S. Appl. No. 15/581,014, Preliminary Amendment filed 4-2817", 9 pgs.

* cited by examiner

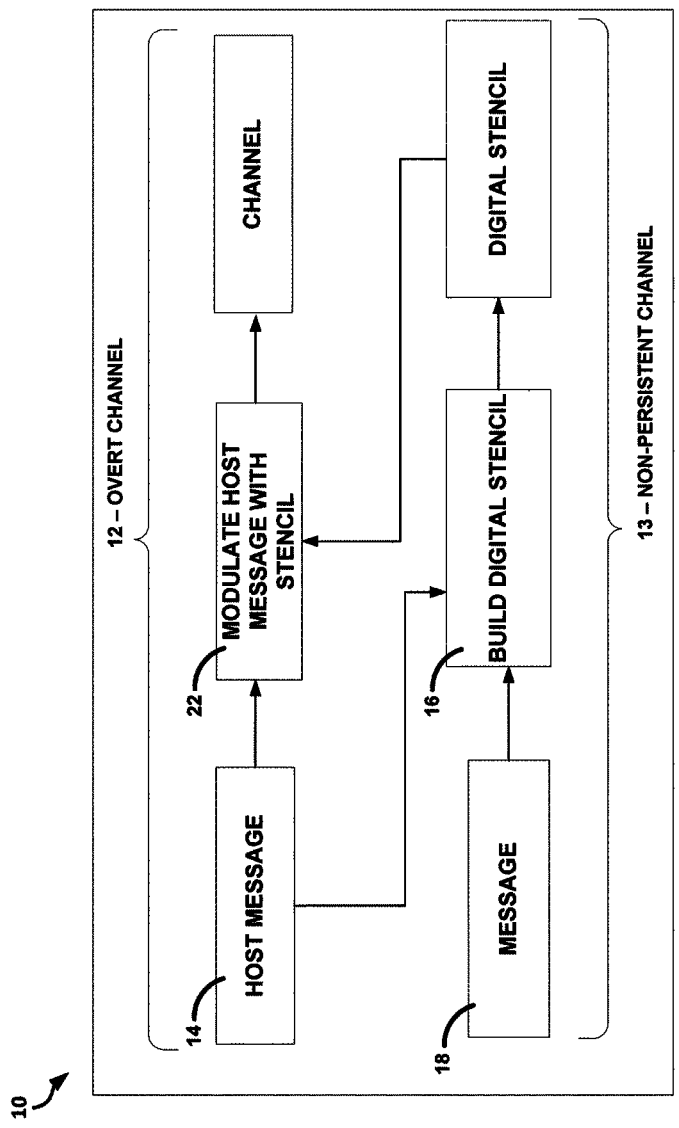
FIGURE 1. STEGANOGRAPHIC APPROACH

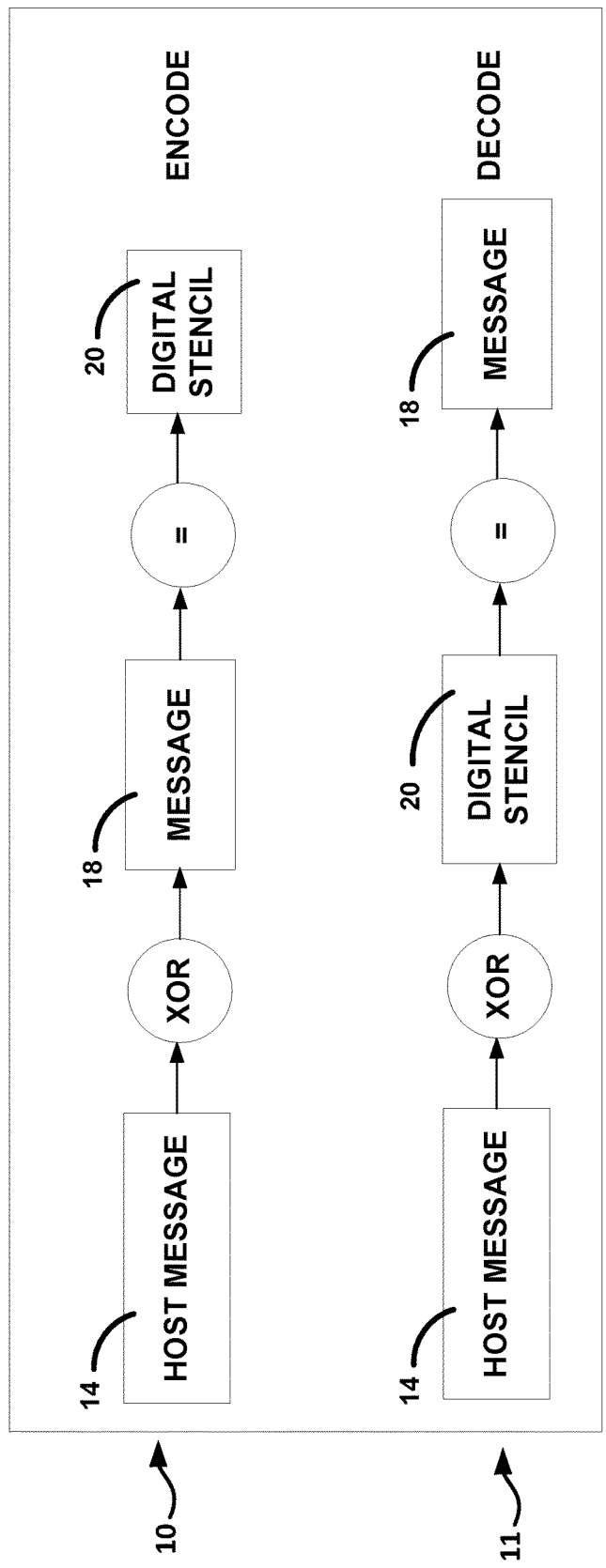

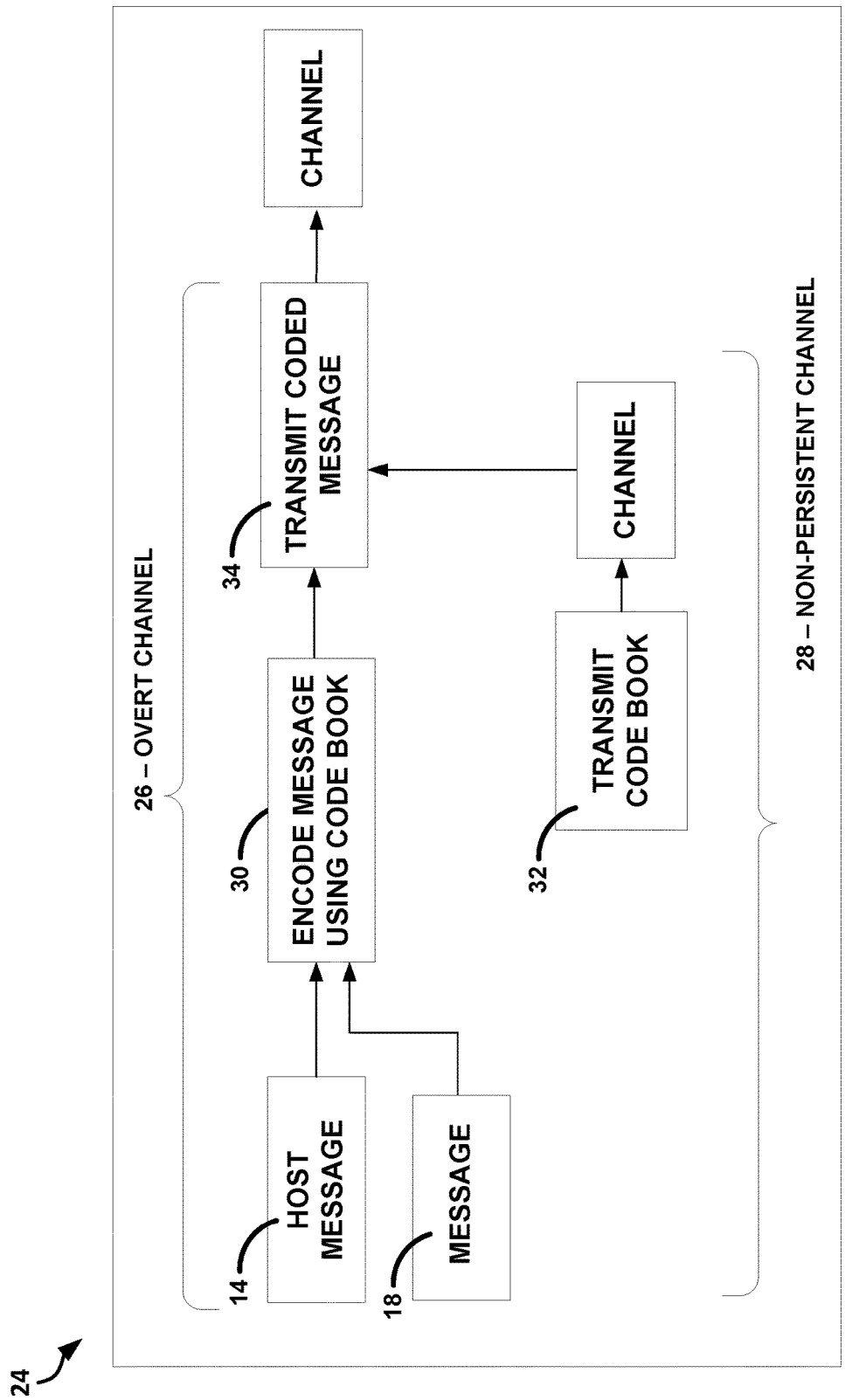
FIGURE 3. MESSAGE ENCODING USING A CODE BOOK

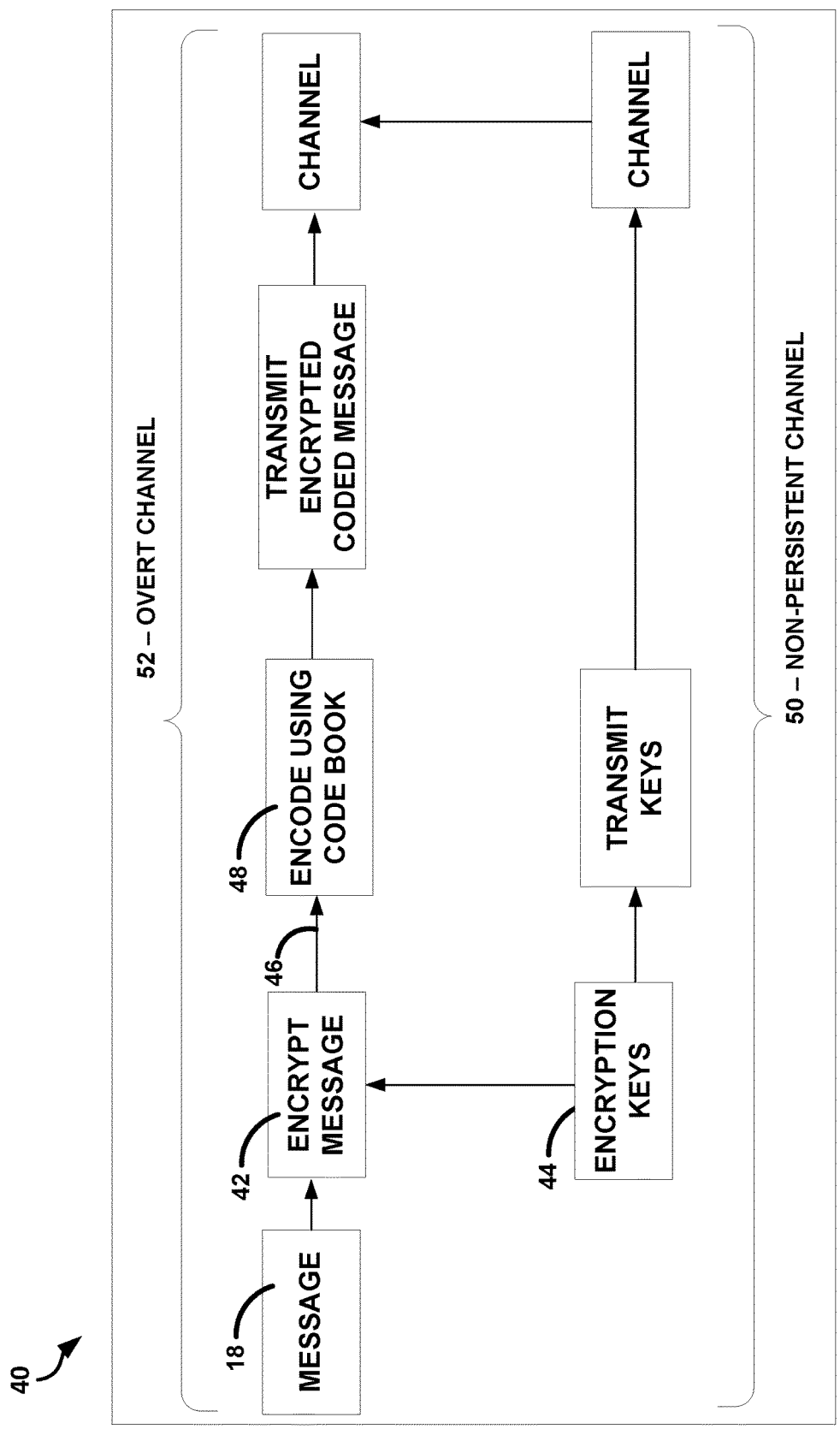
FIGURE 4. MESSAGE ENCODING USING A CODE BOOK

METHOD FOR ENCRYPTION OBFUSCATION

CROSS REFERENCE TO RELATED APPLICATIONS

This application claims priority from U.S. Provisional Patent Application Ser. No. 61/988,409, filed May 5, 2014, U.S. Provisional Patent Application Ser. No. 61/988,416, filed May 5, 2014, U.S. Provisional Patent Application Ser. No. 61/988,423, filed May 5, 2014, and U.S. Provisional Patent Application Ser. No. 61/988,418, filed May 5, 2014, all of which are incorporated herein by reference in their entirety.

FIELD OF THE INVENTION

The present invention generally relates to secure communications, and in particular to such communications which vary the timing of communication signals.

BACKGROUND OF THE INVENTION

Often times, when U.S. Diplomats are working outside the continental United States (OCONUS), communications are closely monitored by the visited country. The monitoring is done to identify transmissions that are considered harmful to local governments. When United States personal are operating in these countries, they need to send their information back to the US using encryption to protect their mission. There are, of course, other instances where securely transmitted communications are very useful. The sending of encrypted messages either over-the-air or over a terrestrial link can bring undesired attention to the sender, which could have damaging consequences. Therefore it is useful to have a method for sending secure communications that do not appear to be secure.

SUMMARY OF THE INVENTION

One embodiment of the present invention provides a system for encoding data in a signal, comprising: at least one signal carrier; an overt persistent digital channel containing a host signal and carried on the at least one signal carrier; a non-persistent channel encoded onto the host signal by timing variation of the host signal, the non-persistent channel including access data for accessing hidden information in the host signal. The term "non-persistent" means that without specific knowledge as to how to receive and process the channel, the data in the non-persistent channel is lost.

The access data may be selected from the group consisting of a stencil, a code book and a decryption key. The host signal may be an intelligible work of nominal information. The host signal may be encrypted and the access data may be an encryption key. The encrypted host signal may be encoded with a code book to reduce entropy, prior to encoding the host signal with the non-persistent channel. The timing variation may be less than a level of timing stability for detecting and capturing the data stream.

The system may further comprise: a processor coupled to receive the host signal from the at least one signal carrier; and a high stability oscillator (HSO) producing a reference signal coupled to the processor for use in reading pulse timing variations of the host signal, wherein the reference signal has a stability greater than the level of timing variations of the host signal; wherein the timing variations of the host signal are smaller than the sampling period for detecting and capturing the data stream. The host signal may be a digital data stream, and the timing variations may be pulse timing variations.

Another embodiment of the present invention provides a method for sending data on a signal carrier, comprising: modulating a host signal in an overt persistent channel to create a non-persistent channel including access data, using timing variations, wherein the access data provides means for accessing hidden data in the host signal; reading timing variations from the host signal for separating the access data; and accessing the hidden data using the access data.

The access data may be selected from the group consisting of a stencil, a code book and a decryption key. The host signal may be an intelligible work of nominal information. The host signal may be encrypted and the access data is an encryption key. The method may further comprise encoding the host signal with a code book to reduce entropy, prior to encoding the host signal with the non-persistent channel. The pulse timing variation may be smaller than the sampling period for detecting and capturing the host signal. The host signal may be a digital data stream, and the timing variations may be pulse timing variations. The host signal may be an analog signal.

BRIEF DESCRIPTION OF THE DRAWINGS

The present invention is illustratively shown and described in reference to the accompanying drawings, in which:

FIG. 1 illustrates a steganographic method in accordance with an embodiment of the present invention.

FIG. 2 illustrates a general method for message encoding and decoding in accordance the embodiment of FIG. 1.

FIG. 3 illustrates a method for message encoding using a code book in accordance with another embodiment of the present invention.

FIG. 4 illustrates a method for message encrypting and encoding in accordance with yet another embodiment of the present invention.

DETAILED DESCRIPTION OF THE DRAWINGS

This application describes three methods for sending secure messages. In the methods described, two channels are used to send the message. The first channel is an overt channel, which carries a message that is openly detectable. The second channel is a non-persistent channel, which includes data or keys for accessing information hidden in the open channel. The term "non-persistent" means that without specific knowledge as to how to receive and process the channel, the data in the non-persistent channel is lost. To create the non-persistent channel, an overt channel is generated with minimal timing jitter as limited by a high stability oscillator (HSO) and other system constraints. Non-persistent data is then encoded onto the nominally jitter-free overt channel by precisely modulating the signal timing. The reference signal has a stability of $10^{-15}$ part of a second as opposed to the de facto industry standard of Cesium, which is $10^{-12}$. An example of implementing a non-persistent channel is described in copending U.S. Patent Application for METHOD AND SYSTEM FOR NON-PERSISTENT COMMUNICATION, filed on the same day herewith, and hereby incorporated herein in its entirety.

Using a modulation scheme such as a Gaussian Clock Dither Modulation scheme and the HSO, the data in the non-persistent channel is imperceptible to anyone not possessing a comparable oscillator tuned to the appropriate frequency. The keys are extracted as they are received and applied directly to the cipher text message, and then the keys are discarded once used. The message and the keys are transmitted and processed in a streaming fashion.

Anyone intercepting these transmissions, not using an HSO with comparable stability, will lose the non-persistent channel, upon reception. This is because the granularity of the received transmission will have insufficient time resolution to detect the non-persistent channel.

The first method 10 is a steganographic approach, which is illustrated in FIG. 1. An overt channel 12 transmits a host message 14. Host message 14 can be any suitable form of digital message, a newspaper article, or other literature or data.

Host message 14 is also provided to a digital stencil module 16. Digital stencil module 16 accepts both the message 18 to be securely transmitted and the host message 14 as inputs, and it outputs a digital stencil 20 identifying the secure message 18 in the host message 14. Digital stencil 20 is a virtual overlay used to identify either the characters, in the case of an ASCII host message 14, or the bits, in the case of a digital host message 14, to be used to decode the host message and reconstruct the actual message 18 that was transmitted. Stencil 20 is then used in a timing modulator 22 to modulate the timing of pulses in host message 14 to form non-persistent channel 13 and thereby transmit the stencil 20. This nominal encoding 10 and decoding 11 is graphically illustrated in FIG. 2. Whereas encoding 10 involves comparing a host message 14 to the message 18 to be sent to produce stencil 20, decoding 11 involves comparing host message 14 to stencil 20 to provide the message 18.

The ability of this embodiment to send the digital stencil along with the message on the non-persistent channel because the stencil is virtually imperceptible reduces risk that a stencil might be intercepted or otherwise compromised. Additionally, the message does not appear to be encrypted because the host message simply appears to be a nominal text.

FIG. 3 illustrates an encoding method 24 which uses a code hook. Again, an overt channel 26 is used for sending a host message 14 and also for carrying a non-persistent channel 28. Host message 14 is simply encoded with a message 18 to be sent in step 30 using a codebook 32. Codebook 32 is transmitted via the non-persistent channel 28 by encoding it onto the encoded message 34 in overt channel 26.

Again, the ability to send the code book along with the message on the non-persistent channel reduces the risk of discovery of the codebook because the code book is virtually imperceptible for the reasons described above. Additionally, the message does not appear to be encrypted.

FIG. 4 illustrates a hybrid method 40 using both encryption and encoding. The message 18 is first encrypted in step 42 using one or more encryption keys 44. The encrypted message 46 is then encoded using a codebook in step 48. This encoding reduces entropy, which is a tell-tale sign of encryption. The one or more encryption keys 44 are provided over the non-persistent channel 50 which is encoded by timing variations onto overt channel 52. For this implementation the code book must be known by both the sender and the receiver.

The implementation of FIG. 4 sends the encryption keys along with the message on the non-persistent channel, and that the encryption keys are virtually imperceptible for the reasons described above. Encryption keys 44 are also readily changeable. Additionally, the message does not appear to be encrypted.

The present invention is introduced using examples and particular embodiments for descriptive purposes. Although a variety of examples are presented to show how various configurations can be employed to achieve the desired improvements, these particular embodiments are only illustrative and not intended in any way to restrict the inventions presented.

The present application, METHOD OF ENCRYPTION OBFUSCATION is being filed on the same day as and in conjunction with related applications: METHOD FOR DETECTING TIME DELAYS IN NON-PERIODIC SIGNALS; METHOD AND SYSTEM FOR NON-PERSISTENT COMMUNICATION; and METHOD AND SYSTEM FOR NON-PERSISTENT REAL-TIME ENCRYPTION KEY DISTRIBUTION, which applications all share some common inventors herewith, and the contents of which are al hereby incorporated herein in their entirety.

What is claimed is:

1. A system for encoding data in a signal, comprising:
   a hardware oscillator to provide at least one signal carrier;
   a host data encoder to encode an overt persistent digital channel containing a host signal on the at east one signal carrier;
   a hardware modulator coupled to the oscillator and the host data encoder to modulate a non-persistent channel onto the at least one signal carrier; and
   the non-persistent channel encoded onto the at least one signal carrier by timing variation of the host signal, the non-persistent channel including access data for accessing hidden information in the host signal, wherein the access data includes at least one of a stencil, a code book and a decryption key.

2. The system of claim 1, wherein the host signal is an intelligible work of nominal information.

3. The system of claim 1, wherein the host signal is encrypted and the access data is an encryption key.

4. The system of claim 3, wherein the encrypted host signal is encoded with a code book to reduce entropy.

5. The system of claim 1, wherein the timing variation is less than a level of timing stability for detecting and capturing the host signal.

6. The system of claim 1, further comprising:
   a processor coupled to receive the host signal from the at least one signal carrier; and
   a high stability oscillator producing a reference signal coupled to the processor for use in reading pulse timing variations of the host signal, wherein the reference signal has a stability greater than the level of timing variations of the host signal; wherein the timing variations of the host signal are smaller than the sampling period for detecting and capturing the data stream.

7. The system of claim 1, wherein the host signal is a digital data stream, and further wherein the timing variations are pulse timing variations.

8. A method for sending data on a signal carrier, comprising:
   providing, by a hardware oscillator, at least one signal carrier;
   encoding, using a host data encoder, an overt persistent digital channel containing a host signal on the at least one signal carrier;
   modulating, using a hardware modulator coupled to the oscillator and the host data encoder, a non-persistent channel onto the at least one signal carrier, the non-persistent channel encoded onto the at least one signal carrier by timing variation of the host signal, the non-persistent channel including access data for accessing hidden information in the host signal, wherein the access data includes at least one of a stencil, a code book and a decryption key;

reading the timing variations from the host signal for separating the access data from the carrier signal and the host signal; and accessing the hidden data using the access data.

9. The method of claim 8, wherein the host signal is an intelligible work of nominal information.

10. The method of claim 8, wherein the host signal is encrypted and the access data is an encryption key.

11. The method of claim 10, further comprising encoding the host signal with a code hook to reduce entropy, prior to encoding the host signal with the non-persistent channel.

12. The method of claim 8, wherein the pulse timing variation is smaller than the sampling period for detecting and capturing the host signal.

13. The method of claim 8, wherein the host signal is a digital data stream, and further wherein the timing variations are pulse timing variations.

14. The method of claim 8, wherein the host signal is an analog signal.

\* \* \* \* \*

UNITED STATES PATENT AND TRADEMARK OFFICE
CERTIFICATE OF CORRECTION

PATENT NO. : 9,755,674 B2  
APPLICATION NO. : 14/704900  
DATED : September 5, 2017  
INVENTOR(S) : Graceffo et al.

Page 1 of 1

It is certified that error appears in the above-identified patent and that said Letters Patent is hereby corrected as shown below:

On the Title Page

In item (54), in "Title", in Column 1, Line 1, delete "METHOD" and insert --METHODS-- therefor On page 2, in Column 2, under "Other Publications", Line 23, delete "4-2817"," and insert --Apr. 28, 2017",--therefor In the Specification In Column 1, Line 1, delete "METHOD" and insert --METHODS-- therefor In Column 3, Line 40, delete "hook." and insert --book.-- therefor In Column 4, Line 17, delete "al" and insert --all-- therefor In the Claims In Column 4, Line 22, in Claim 1, delete "east" and insert --least-- therefor In Column 4, Line 49, in Claim 6, delete "signal;" and insert --signal,-- therefor In Column 5, Line 13, in Claim 11, delete "hook" and insert --book-- therefor Signed and Sealed this  
Fourteenth Day of July, 2020

Andrei Iancu  
*Director of the United States Patent and Trademark Office*